F. S. Wyman,
Can Opener.
Nº 80,326.   Patented July 28, 1868.
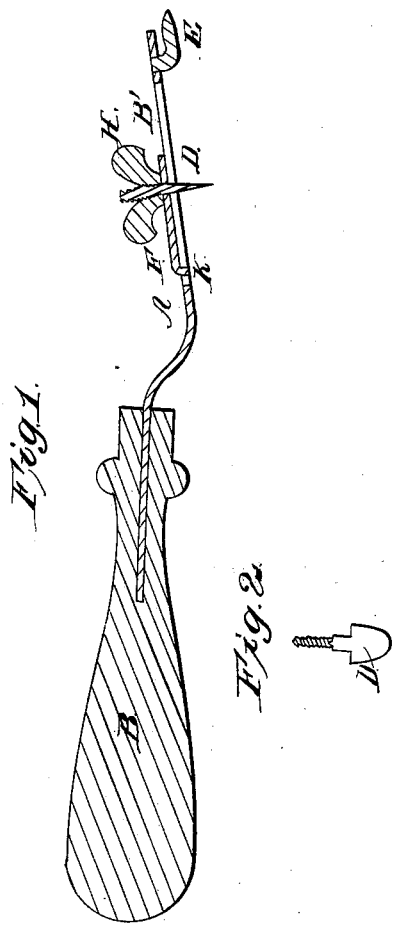
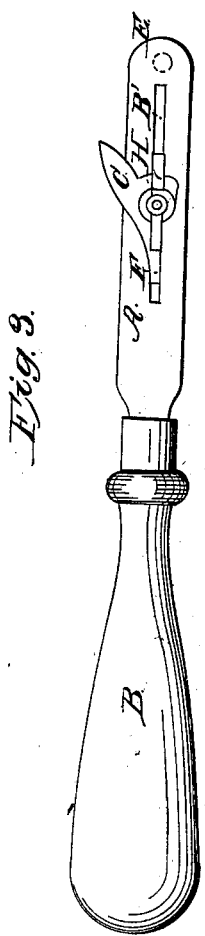
Witnesses:
Inventor:
F. S. Wyman

United States Patent Office.

F. S. WYMAN, OF CHICAGO, ILLINOIS.

Letters Patent No. 80,326, dated July 28, 1868.

IMPROVEMENT IN CAN-OPENERS.

The Schedule referred to in these Letters Patent and making part of the same.

TO ALL WHOM IT MAY CONCERN:

Be it known that I, F. S. WYMAN, of Chicago, in the county of Cook, in the State of Illinois, have invented an Improved Can-Opener; and I do hereby declare that the following is a full and exact description thereof, reference being had to the accompanying drawings, and to the letters of reference marked thereon, making a part of this specification, in which—

Figure 1 is a longitudinal sectional elevation of my invention.

Figure 2, a view of one of the knives detached from the sliding plate.

Figure 3, a side elevation.

The nature of my invention consists in the attachment of a sharp-pointed knife to the adjustable plate of circular-can opener, by means of which square and longitudinal openings may be made in fruit-cans with the same tool which is used to make round holes. This arrangement is especially desirable, for without it a hole cannot be made which has a greater diameter than the thickness of the can, and as such a size is entirely too small for many purposes, such as for sardine-boxes, &c., the circular opener is not generally used, but by the attachment of a side knife, a more complete tool is provided, and one which will fully answer all practical purposes.

In order to give a correct understanding of my invention, I have marked corresponding parts with similar letters, and will now give a detailed description.

A represents a slotted plate, fitted in a handle, B, and having a pointed pivot, E, used as an axis for the knife D, the same as in the patent of S. D. Lecompte, of September 19, 1865, and has a plate, F, arranged to run in the slot B' and support the knife D, held in place by a set-screw, H, when moved in said slot to suit the semi-diameter of the opening to be made. This plate F has a side knife, C, arranged to fit closely against the side of the slotted plate A, and is used to make rectangular openings in cans when circular ones will not answer the purpose, and may be set to or from the end of said plate A, as most convenient for the operator's use.

The plate F and knife C should be made of a single piece of steel, and with a nib, K, to guide it in the slot B, as seen at fig. 1, and the knife should be tempered so as to hold a good edge.

It will be seen from this description that the knife C is not in the way of operating the knife D, and that it can be set near enough to the end of plate A to permit the handle B to move over a large flat surface without interfering with the hand.

Having thus described my invention, I do not claim the device herein described for making circular openings, it having been patented by S. D. Lecompte, September 19, 1865; neither do I claim broadly the knife C, as a similar device was patented by S. P. Chapin, July 17, 1866; but

What I do claim, and desire to secure by Letters Patent of the United States, is—

The knife C, rigidly attached to the adjustable plate F of a "circular-can opener," and constructed to operate substantially as herein set forth.

F. S. WYMAN.

Witnesses:
G. L. CHAPIN,
A. HAYWARD.